United States Patent [19]

Kandachi et al.

[11] Patent Number: 4,992,321
[45] Date of Patent: Feb. 12, 1991

[54] HEAT RESISTANT FOAMED GLASS

[75] Inventors: Takayoshi Kandachi; Nobuo Nakamura, both of Osaka, Japan

[73] Assignee: Central Glass Company, Limited, Ube, Japan

[21] Appl. No.: 209,626

[22] Filed: Jun. 21, 1988

[30] Foreign Application Priority Data

Jun. 22, 1987 [JP] Japan .................. 62-153501
Sep. 30, 1987 [JP] Japan .................. 62-244085

[51] Int. Cl.$^5$ .................. C03C 11/00; B32B 7/02; B32B 5/14
[52] U.S. Cl. .................. 428/213; 428/215; 428/309.9; 428/212; 501/39
[58] Field of Search .................. 106/74, 85, 75; 428/309.9, 312.2, 312.6, 318.6, 213, 215, 212, 323, 331, 428, 433; 501/39, 32

[56] References Cited

U.S. PATENT DOCUMENTS

| | | | |
|---|---|---|---|
| 4,332,907 | 6/1982 | Vieli .................. | 106/75 |
| 4,347,326 | 8/1982 | Iwami et al. .................. | 106/75 |
| 4,425,291 | 1/1984 | Beer et al. .................. | 106/75 |
| 4,430,108 | 2/1984 | Hojaji et al. .................. | 501/39 |
| 4,798,758 | 1/1989 | Nagano et al. .................. | 428/309.9 |
| 4,833,015 | 5/1989 | Furuuchi et al. .................. | 428/309.9 |

*Primary Examiner*—William R. Dixon, Jr.
*Assistant Examiner*—Paul Marcantoni
*Attorney, Agent, or Firm*—Fleit, Jacobson, Cohn, Price, Holman & Stern

[57] ABSTRACT

A foamed glass high in mechanical strength and high in resistance to heat and thermal shocks is obtained by dispersing therein 0.2–5 wt % of 3–50 mm long pieces of a corrosion resistant steel wire whose thermal expansion coefficient is equivalent to or slightly larger than that of the glass, such as a ferritic chromium stainless wire. The glass itself is an ordinary glass such as alkali-lime glass. A similarly heat resistant foamed glass is obtained by dispersing therein less than 10 wt % and not less than 1 wt % of at least one inorganic non-metallic heat-resistant filler, which is selected from fibrous and flaky materials 0.1–3 mm in length of each particle and powdery and granular materials 0.8–1000 μm in particle or grain size. Typical examples of useful nonmetallic fillers are wollastonite, shale flakes, pyrophyllite, alumina-chromium cermets and corundum.

25 Claims, No Drawings

HEAT RESISTANT FOAMED GLASS

BACKGROUND OF THE INVENTION

This invention relates to a cellular-structure glass or foamed glass in which at least one metallic or nonmetallic reinforcing material in the form of relatively small pieces or particles is dispersed for enhancement of heat resistance as well as mechanical strength. The heat resistant foamed glass is chiefly for use as a building material.

Recently foamed glass has been attracting much interest as a lightweight and heat insulating material that may be used in buildings and other constructions Thus far, however, applications of foamed glass are limited by reason of weakness against external mechanical force and against heating. Foamed glass of relatively high porosity is easily broken by a mechanical shock and collapses by rapid heating to 300–400° C.

Low resistance of foamed glass to rapid heating with flames is attributed to the principal features of foamed glass. When a foamed glass plate or block is rapidly heated on one side thereof a steep temperature gradient is created in the foamed glass body due to lowness of heat conductivity, and the temperature gradient causes cracking of the foamed glass. Besides, rapid expansion of gases confined in the foamed glass and also gasification of a residue of the foaming agent accelerate collapsing of the heated foamed glass body.

It is known to reinforce foamed glass or ceramics by embedding or dispersing therein metal fibers as shown, for instance, in JP-A No. 60-36384. However, improvements in heat resistance including resistance to thermal shocks are deemed still insufficient.

Also it has been proposed to reinforce foamed glass or ceramics with nonmetallic mineral materials. JP-A No. 52-15603 shows a foamed glass containing a large amount of inorganic refractory material such as quartz, alumina and/or zircon together with talc and/or clay. JP-A No. 58-135153 shows a foamed glass containing a laminar mineral such as mica or vermiculite, and Journal of Materials Science, 16 (1981), 800–808 also shows a foamed glass containing mica powder. However, foamed glass containing a large amount of refractory material is rather low in mechanical strength and high in water absorption and, hence, is unsuitable as a building material. The proposed addition of a laminar mineral does not result in sufficient enhancement of resistance of foamed glass to thermal shocks.

SUMMARY OF THE INVENTION

It is an object of the present invention to provide a foamed glass which is improved in both mechanical strength and heat resistance and has good resistance to thermal shocks.

The present invention provides a reinforced and heat resistant foamed glass which comprises 0.2 to 5 wt % of pieces of a corrosion resistant steel wire dispersed in a matrix of foamed glass. The thermal expansion coefficient of the steel wire in this foamed glass is 1 to 1.3 times as large as the thermal expansion coefficient of the glass, and the wire pieces are each 3 to 50 mm in length and 0.01 to 2 mm² in cross-sectional area.

The wire used in this invention may not be circular in cross-sectional shape, and the wire pieces may be bent, curved or waved. In this foamed glass it is best to use a wire of ferritic corrosion resistant steel containing 13–20 wt % of Cr.

The wire pieces dispersed in the foamed glass serve the function of binding and anchoring the foamed glass, whereby the foamed glass is mechanically reinforced and acquires remarkable resistance to heat and thermal shocks. A foamed glass according to the invention can endure rapid heating to 500° C. or above, whereas ordinary foamed glasses not containing wire pieces easily collapse by rapid heating to 300°–400° C. Accordingly a foamed glass according to the invention is very suitable and advantageous as an interior or exterior decorative material or an exterior wall material in buildings and other constructions.

Furthermore, the present invention provides a reinforced and heat resistant foamed glass which uses an alkali-lime glass and comprises less than 10 wt % and not less than 1 wt % of at least one inorganic non-metallic reinforcing filler, which is higher than 1000° C. in melting temperature and is selected from fibrous and flaky materials 0.1–3 mm in length and powdery and granular materials 0.8–1000 μm in particle or grain size.

Typical examples of the nonmetallic filler(s) are shale flakes, wollastonite and/or pyrophyllite.

A foamed glass containing the above defined inorganic nonmetallic filler(s) is enhanced in mechanical strength and has remarkable resistance to heat and thermal shocks. This foamed glass can endure rapid heating to 500° C. or above.

BRIEF DESCRIPTION OF THE DRAWING

FIG. 1 is a chart showing a general manner of thermal expansion of a glass;

FIG. 2 is an enlarged perspective view of a wire which has local dents in the surface and is suitable for use in this invention;

FIG. 3 is an enlarged perspective view of a twisted wire suitable for use in this invention;

FIG. 4 is an enlarged perspective view of a cross-sectionally rectangular wire which has local dents on the surface and is suitable for use in this invention; and FIG. 5 is a perspective view of a sample of a foamed glass plate under hating with a gas burner for evaluation of heat resistance.

DESCRIPTION OF THE PREFERRED EMBODIMENTS

In a heat resistant foamed glass according to the invention using wire pieces as an essential component, the type of the glass is not strictly limited. Usually a soda-lime glass is used, but it is also possible to use a different glass such as lead-silica glass, alkali-silicate-lead glass, aluminosilicate-lime glass or aluminosilicate-alakali glass.

On the precise that wire pieces are used to enhance heat resistance as well as mechanical strength, moderate foaming of the glass is desirable in this invention. That is, when an ordinary glass having a true specific gravity of about 2.5 is used it is suitable to foam the glass to such a degree that foamed glass has an apparent specific gravity of from 0.6 to 2.0. When the apparent specific gravity is below 0.5 the foamed glass does not endure temperatures of hundreds of degrees centigrade, though such a high-foam glass is useful as a heat insulating material at relatively low temperatures. When the foamed glass is too high in apparent specific gravity, which means very low porosity, the glass is hardly effective for heat insulating purposes and, besides, is liable to break when rapidly heated since there is little room for absorption and dispersion of strains induced by heating.

According to the invention the thermal expansion coefficient (linear expansion coefficient) of the wire material is strictly limited, as stated hereinbefore in relation with the thermal expansion coefficient of the glass used as the basic material. Referring to FIG. 1, there is a linear relationship between temperature and the amount of thermal expansion of a glass, as indicated at $\alpha$, over the range from normal temperature to the transition point of the glass. In the usual sense the thermal expansion coefficient ($\alpha$) of the glass refers to the inclination of the line segment $\alpha$. However, an abnormal expansion of the glass takes place while the glass temperature is between the transition point and the softening point, as indicated at $\alpha'$ in FIG. 1. Therefore, a mean thermal expansion coefficient over the range from normal temperature to the softening point, indicated at $\alpha''$ in FIG. 1, differs from the expansion coefficient ($\alpha$) in the usual sense. The value of this mean expansion coefficient ($\alpha''$) is usually about 1.2 times the expansion coefficient ($\alpha$), though it depends on some factors including the composition of the glass and heat history of the glass.

Foaming of a glass is accomplished by heating the glass together with a foaming agent to a temperature above the softening point thereby fluidifying the glass. In the subsequent cooling process the glass shrinks along the curve $\alpha + \alpha'$ in FIG. 1. In order that the wire pieces dispersed in the glass may not induce any strains in the glass, it is required that the wire material should shrink in exact accordance with the shrinking of the glass. However, no practically available wire material meets such a requirement. Therefore, in the present invention it is intended to use a wire material whose thermal expansion coefficient is close to the aformentioned mean expansion coefficient ($\alpha''$) of the glass, and the expansion coefficient of the wire material is specified to be 1.0 to 1.3 times the expansion coefficient ($\alpha$) of the glass. When such a wire material is used cooling of the foamed glass containing pieces of the wire is accomplished with only very slight straining of the glass. It is preferable that the expansion coefficient of the wire material is from 1.1 to 1.3 times the expansion coefficient ($\alpha$) of the glass.

In the practice of the invention it is suitable to use a steel wire since steel wires are widely supplied at low prices and are corrosion resistant to some extent. In particular it is preferred to use a ferritic chromium stainless steel wire containing 13-20 wt % of Cr. Such ferritic steel wires are widely used and can easily be purchased. Moreover, such ferritic steels are excellent in corrosion resistance and have a thermal expansion coefficient of about $120 \times 10^{-7}/°$ C. or slightly smaller, whereas commonly used glasses represented by soda-lime glass have a thermal expansion coefficient of about $95 \times 10^{-7}/°$ C. Ferritic chromium steel wires can be used also in a different glass whose thermal expansion coefficient is close to that of soda-lime glass, such as lead-silica glass, alkalisilicate-lead glass, aluminosilicate-lime glass or aluminosilicate-alkali glass.

In contrast, austenitic steels represented by 18Cr-8Ni stainless steel are unsuitable for use in this invention because their thermal expansion coefficients are as large as about $180 \times 10^{-7}/°$ C. Martensite steels are not suitable despite their high strength attributed to quench hardening. If a martensite steel is incorporated in a foam glass the steel undergoes annealing during cooling of the foamed glass, which is accompanied by precipitation and separation of some carbon and other alloying elements from the steel, whereby the steel becomes brittle and degraded in corrosion resistance.

For dispersion in a foamed glass a selected steel wire is cut into pieces of suitable lengths. The wire pieces dispersed in the foamed glass are expected to bind and anchor the glass phase so that the glass phase may not easily crack and may not break even if some cracks are produced. However, the wire pieces do not exhibit such reinforcing effects if the length of each wire piece is too short. In this invention each of the wire pieces dispersed in the foamed glass should be at least 3 mm in length. On the other hand, it is undesirable to use excessively long pieces of wire, because at the stage of cooling the melted and foamed glass there arises a considerable difference between lengthwise shrinkage of each wire piece and shrinkage of the surrounding glass possibly with the result that cracks or interstices appear in the glass phase. A similar problem arises when each of the wire pieces is too thick. Therefore, wire pieces used in this invention are not longer than 50 mm and not greater than 2 mm² in cross-sectional area.

Seemingly it is favorable for the reinforcing effects of the dispersed wire pieces to use a very thin wire to thereby increase the area of contact between the wire and the glass. Actually, however, very thin wires often fail to serve the reinforcing purpose because of corrosion or erosion. In producing the reinforced foamed glass the wire pieces make contact with a melt of the glass, such as an alkaline melt of soda-lime glass, and also with corrosive or oxidizing gases such as $H_2O$, $CO_2$ and $O_2$ at high temperatures. If the wire is very thin erosion of each piece of wire will easily reach the core region, and the eroded wire pieces become brittle. Therefore, this invention uses a steel wire not smaller than 0.01 mm² in cross-sectional area.

In this invention the content of wire pieces in the reinforced foamed glass is from 0.2 to 5 wt %. If the content of the wire pieces is less than 0.2 wt % the reinforcing effect is insufficient. The inclusion of wire pieces does not significantly affect heat conductivity of the foamed glass so far as the content of the wire pieces is not more than 5 wt %. When the content of the wire pieces exceeds 5 wt % degradation of the heat insulating capability of the foamed glass due to increased heat conductivity is no longer negligible, and the foamed glass becomes high in specific gravity.

The wire pieces are substantially uniformly dispersed in the foamed glass. Usually it suffices to randomly orient the wire pieces in the foamed glass. When the reinforced foamed glass is in the form of a plate relatively small in thickness it is desirable that a large portion of the dispersed wire pieces are oriented parallel to the major surfaces of the plate, because in such a plate of foamed glass cracks are liable to develop in the direction perpendicular to the major surfaces of the plate. Such orientation of the wire pieces can be accomplished by carrying out firing of the glass material containing wire pieces with application of a suitable pressure, as will be described hereinafter.

Most of steel wires are circular in cross sections, and such steel wires can be used in the present invention. However, it is rather preferable to use a steel wire having an elliptical or rectangular cross-sectional shape. Considering extracting a wire embedded in a glass by pulling, extraction is relatively easy if the wire is straight and cross-sectionally circular. That is, when a reinforced foamed glass according to the invention is mechanically or thermally stressed the binding and anchoring functions of the dispersed wire pieces may not always be sufficient if the wire is circular in cross sections. The resistance of the wire embedded in glass to the pulling force considerably augments when the wire is cross-sectionally elliptical or rectangular or, irrespective of the cross-sectional shape, has dented and/or protruding regions on the surface.

As will be understood from the above explanation, the reinforcing effects of the wire pieces dispersed in the foamed glass depend not only on a chemical bonding force between the wire pieces and the glass but also, and significantly, on the frictional resistance between each wire piece and the glass. In this regard, the reinforcing effects can be augmented also by using curved, bent or twisted pieces of wire.

When a cross-sectionally circular wire is used it is preferable to form dented regions and/or protruding regions on the wire surface and/or curving or waving, bending or twisting the wire. For example, FIG. 2 shows a wire 10 which is circular in cross-sectional shape and has a number of dents 12 in the surface at suitable intervals. In the case of a cross-sectionally elliptical or rectangular wire the wire may be used without any special working. In this case it is suitable that the longer diameter or longer side of the cross section is at least two times as long as the shorter diameter or shorter side. Also in this case it is preferable to form dented regions and/or protruding regions on the wire surface and/or curving, bending or twisting the wire. For example, FIG. 3 shows a wire 20 which is elliptical in cross-sectional shape and is twisted. FIG. 4 shows a wire 30 which is rectangular in cross-sectional shape, is gently curved and has a number of dents 32 in the opposite surfaces. In curving or bending the wire pieces it suffices to provide a single turn, or two turns at most, to each piece of wire. More elaborately curved or bent wire pieces will be tangled with each other at the stage of mixing with the glassmaterial, and the tangled wire pieces are inferior in dispersibility.

A reinforced foamed glass according to the invention can be produced by using known methods for producing ordinary foamed glasses. The fundamental material is a mixture of a fine powder of a selected glass and a suitable amount of a foaming agent such as calcium carbonate. The mixture may be used in powder form, but in most cases it is more advantageous to granulate the mixture into grains not larger than about 3 mm by using a suitable binder such as water glass. The mixture is further mixed with selected wire pieces, and the resultant mixture is fired to accomplish foaming and shaping of the foamed glass containing wire pieces.

A block or plate of a reinforced foamed glass according to the invention can advantageously be produced in a continuous manner by using a belt conveyor system having a pair of vertically spaced and horizontally running belts made of a heat resistant material The mixture of the glass powder, foaming agent and wire pieces is layered on the lower belt and is tightly covered with the upper belt. In that state the heat resistant belts passes through a furnace to accomplish firing and foaming of the glass material packed between the two belts. It is favorable to apply a suitable compressive pressure to the fired material through the belts before cooling the fired material. After that the fired and foamed material is slowly cooled in the usual manner.

Optionally the present invention can be embodied in a two-layer foam glass block or plate which consists of a base layer of a foamed glass containing wire pieces and a covering layer of a foamed glass not containing wire pieces. The two layers are formed simultaneously so that the covering layer may inseparably bond to the base layer. The covering layer has the effect of concealing the wire pieces exposed on the surface of the reinforced foamed glass, so that the two layer glass plate assumes a pretty appearance when used as a decorative material or a wall material. It is suitable to make the covering layer relatively thin and not more than about 3 mm in thickness. Rapid heating of the covering layer will cause this layer to crack, but the cracking does not result in collapsing of the covering layer since it is fuse bonded to the reinforced base layer. If desired another covering layer of foamed glass may be formed on the opposite side of the reinforced base layer to thereby modify the above described two-layer foam glass plate into a three-layer plate.

The covering layer of foamed glass may be reinforced by dispersing therein an inorganic nonmetallic reinforcing filler material which provides resistance to heat and thermal shock. The reinforcing material is a powdery or granular material such as pyrophyllite, zircon or corundem, a fibrous material such as wollastonite or chrysotile or a foliaceous material such as flakes of shale. It is possible to use a mixture of two or more kinds of such filler materials. The covering layer containing such a filler hardly cracks even when rapidly heated by flames, and in the case of using a fibrous or flaky filler the possibility of collapsing of the covering layer further reduce since the filler exhibits binding and anchoring functions even if the foamed glass cracks. When a suitable reinforcing filler is used the thickness of the covering layer is not limited to about 3 mm.

It is possible to further reinforce the foamed glass containing wire pieces by dispersing therein any of the above described inorganic nonmetallic fillers, irrespective of covering the reinforced foamed glass with a foamed glass layer not containing wire pieces.

As another option, the covering layer of foamed glass not containing wire pieces may further be covered with a relatively thin layer of a dense (nonporous) glass having a smooth outer surface. The dense glass layer offers a grave impression inherent to glass, and seeing the foamed glass through the dense glass layer augments an ornamental effect. The dense glass layer too is formed simultaneously with the reinforced base layer and the covering foamed glass layer.

Also it is possible to form a covering layer of a dense glass directly on the foamed glass containing wire pieces as an alternative to the above described covering layer of a foamed glass.

In the case of producing a two-layer glass plate according to the invention by using the belt conveyor system described hereinbefore, the powdery or granular material of the base layer containing wire pieces is layered on the lower belt and is overlaid with a powdery or granular material of the covering layer, which may be either a foamed glass layer of a dense glass layer, such that the overlying material is tightly covered by the upper belt. The materials thus packed between the two belts are introduced into a furnace and fired in the same manner as in producing a single layer plate of foamed glass. In the case of a three-layer glass plate in which the base layer of foamed glass containing wire pieces is dually covered with a foamed glass layer and a dense glass layer, the three kinds of materials for the respective layers are packed in layers between the lower and upper belts of the aforementioned belt conveyor system.

EXAMPLES 1-10

In every example, a 25 mm thick plate of a foamed glass containing pieces of a ferritic chromium stainless steel wire was produced by the same method using fundamentally the same glass material. The degree of foaming of the glass, content of Cr in the steel wire, amount of addition of the wire pieces and the shape and dimensions of the wire pieces were variables.

A mixture of a soda-lime glass powder smaller than 150 μm in particle size and a suitable amount of calcium carbonate in fine powder form as a foaming agent was granulated into grains smaller than 3 mm by using a small amount of water glass as binder. Then selected wire pieces were added to and mixed with the granulated glass material. The resultant mixture was introduced into a furnace by using a belt conveyor system having a pair of vertically spaced and horizontally running endless belts made of a heat resistant material. That is, the mixture was packed between the two belts and, in that state, was fired in the furnace at a predetermined temperature in the range from 750° to 900° C. A suitable pressure was applied to the fired material through the belts. The fired and foamed glass was slowly cooled, and the obtained foamed glass plate containing the wire pieces was cut into segments of suitable size.

The particulars of the aforementioned variables were as shown in Table 1, wherein the shape of wire pieces in each example is indicated by a combination of three characters, such as R-1-A in Example 1. The first character represents the cross-sectional shape of the wire.

R: rectangular. E: elliptical. C: circular.

The figure in the middle represents the lengthwise shape.

1: straight. 2 twisted. 3: bent. 4: waved.

The third character represents the surface condition.

A: neither dented nor protruded. B: locally dented.

The reinforced foamed glasses of Examples 1-10 were subjected to the tests described hereinafter. For comparison, some reinforced foamed glasses not in accordance with the invention were produced as Comparative Examples 1-6 and subjected to the same tests.

COMPARATIVE EXAMPLES 1-6

In every case the glass material and the foamed glass manufacturing method were the same as in the above Examples. Ferritic chromium wires were used except in Comparative Examples 3 and 4. The particulars of the wire pieces used in the Comparative Examples are shown in Table 1.

High Temperature Heating Test

Referring to FIG. 5, the sample 100 of every reinforced foamed glass was a 22 cm × 22 cm square plate. The foamed glass plate 100 was suspended by holders 110, and a gas burner 120 was used to blow flames on one surface of the foamed glass plate 100 as indicated by arrows. The burner 120 was regulated and operated so as to raise the temperature of the directly heated area of the glass plate 100 to 550–600° C. in 5 min and to maintain that temperature for the following 10 min. After that the glass plate 100 was left cooling. On the tested foamed glass plate the degree of cracking was visually examined.

Repeated Heating And Cooling Test

The sample of every reinforced foamed glass was a 90 cm × 120 cm rectangular plate. A central area of the foamed glass plate was irradiated with infrared ray for 1 hr such that the glass surface temperature rose to 200° C. in the central area while the maximum of temperature differences produced on the same side of the glass plate reached 40° C. After that the glass plate was left cooling for 2 hr. This heating-cooling cycle was repeated 40 times. On the tested foamed glass plate the degree of cracking was visually examined.

Freezing Test

The sample of every reinforced foamed glass was a 22 cm × 22 cm square plate. The foamed glass plate was kept immersed in water at 30° C. for 1 hr, and then the wet glass plate was put into a freezer maintained at −30° C. and kept therein for 1 hr. This wetting-freezing cycle was repeated 100 times. If the testing creates interstices between the foamed glass and the dispersed wire pieces, water will intrude into the interstices and freezing and resultant expansion of the water will cause cracking of the foamed glass. The degree of cracking in the tested foamed glass plate was visually examined.

TABLE 1

| | Foamed Glass | | Steel Wire Pieces | | |
|---|---|---|---|---|---|
| | Apparent Specific Gravity | Cont. of Wire Pieces (wt %) | Cont. of Cr (wt %) | Shape | Length (mm) | Sectional Area (mm$^2$) |
| Ex. 1 | 0.7 | 0.5 | 20 | R-1-A | 5 | 0.01 |
| Ex. 2 | 0.7 | 0.7 | 13 | E-2-A | 3 | 0.03 |
| Ex. 3 | 1.1 | 0.9 | 18 | R-1-B | 12 | 0.1 |
| Ex. 4 | 1.1 | 3.8 | 13 | E-1-A | 8 | 0.5 |
| Ex. 5 | 1.3 | 2.5 | 18 | R-1-A | 18 | 1.7 |
| Ex. 6 | 1.3 | 3.1 | 18 (*1) | C-3-A | 31 | 0.8 |
| Ex. 7 | 1.7 | 1.2 | 18 | R-4-A | 38 | 0.05 |
| Ex. 8 | 1.7 | 2.1 | 20 | E-3-B | 23 | 1.1 |
| Ex. 9 | 2.0 | 5.0 | 20 | C-4-A | 45 | 1.9 |
| Ex. 10 | 2.0 | 4.7 | 13 | R-2-A | 48 | 1.5 |
| Comp Ex. 1 | 0.3 | 0.8 | 18 | C-1-A | 1 | 0.006 |
| Comp. Ex. 2 | 2.2 | 8.3 | 20 | R-4-B | 71 | 1.7 |
| Comp. Ex. 3 | 1.3 | 2.7 | (*2) | R-1-A | 11 | 1.5 |
| Comp. Ex. 4 | 1.3 | 3.5 | (*3) | E-2-A | 17 | 1.8 |
| Comp. Ex. 5 | 0.9 | 0.2 | 13 | C-1-A | 9 | 0.2 |
| Comp. Ex. 6 | 1.9 | 4.5 | 18 | E-1-A | 43 | 3.1 |

(*1) contained 2 wt % Mo together with Cr.
(*2) austenitic steel, contained 18 wt % Cr and 8 wt % Ni.
(*3) martensite steel, contained 10 wt % Ni.

The reinforced foamed glasses of Examples 1-10 passed the above described tests with very good results. The high temperature heating test produced only a small number of tiny cracks in the samples of Examples 3 to 10 and somewhat larger cracks in the samples of Examples 1 and 2. In every sample subjected to the repeated heating and cooling test no cracking was observed, and in every sample subjected to the freezing test no change was observed.

The same tests on the reinforced foamed glasses of Comparative Examples 1-6 resulted differently. The foamed glass of Comparative Example 1 (high in porosity, very short in length and very small in cross-sectional area of the dispersed wire pieces) seriously cracked and partly broke by the heating test and slightly cracked by the heating and cooling test, though no change was produced by the freezing test. The foamed glass of Comparative Example 2 (high in apparent specific gravity, high in the content of wire pieces which were very long) was comparative to the foamed glasses of Examples 1 and 2 in the results of the three tests but this foamed glass was inferior in heat insulating capability and had cracks at the ends of some of the wire pieces. The foamed glass of Comparative Example 3 (using an austenitic steel wire) seriously cracked by the heating test, somewhat cracked by the heating and cooling test and locally broke by the freezing test. The foamed glass of Comparative Example 4 (using a martensite steel wire) seriously cracked by the heating test and slightly cracked by the heating and cooling test and also by the freezing test. The foamed glass of Comparative Example 5 (relatively low in the content of wire pieces which were circular in every section and straight) seriously cracked by the heating test and slightly cracked by the heating and cooling test though no change was produced by the freezing test. The foamed glass of Comparative Example 6 (using a thick wire) somewhat cracked by the heating test and slightly cracked by the heating and cooling test. This foamed glass was inferior in cuttability and had cracks around some of the dispersed wire pieces.

EXAMPLES 11-15

These examples relate to two-layer glass plates each consisting of a base layer of a foamed glass containing wire pieces and a covering layer of either a foamed glass or a dense glass. In every example the base layer was 25 mm thick, and the covering layer had a thickness of 5 mm or 3 mm.

In Examples 11, 12 and 14, the base layer was identical with the foamed glass of Example 5 (containing 18-mm pieces of 2.5 wt % of 18Cr ferritic steel wire) except the degree of foaming. In Example 13, the base layer was identical with the foamed glass of Example 10 (containing 48-mm pieces of 13Cr ferritic steel wire) except the degree of foaming. In Example 15 the base layer was fundamentally of the foamed glass of Example 5, but 3 wt % of alumina powder was dispersed in the foamed glass in addition to the wire pieces.

In Examples 11-14, the covering layer was a foamed glass layer containing a nonmetallic powdery, fibrous or flaky filler, as shown in Table 2. In every case the filler was directly mixed with the soda-lime glass powder and the foaming agent used in Examples 1-10. In Example 15 the covering layer was a dense glass layer formed by firing 1-4 mm particles of soda-lime glass.

In every example the two-layer glass plate was produced by introducing the material of the base layer and the material of the covering layer into a furnace in the state packed in layers between the vertically spaced two endless belts used in Examples 1-10 and firing the materials in that state at a suitable temperature between 750°-900° C., with application of a suitable pressure, and slowly cooling the fired and foamed glass.

The two-layer glass plates of these examples were subjected to the above described high temperature heating test, in which flames were blown against the covering layer. After testing, in the samples of Examples 11-14 a small number of tiny cracks were found in the covering layer. In the sample of Example 15 somewhat larger cracks were found in the covering layer of dense glass, but the covering layer had not collapsed.

TABLE 2

| | Base Layer | | Covering Layer | | |
|---|---|---|---|---|---|
| | Wire Pieces | S.G. | Nonmetallic Filler | S.G. | Thickness (mm) |
| Ex. 11 | same as in Ex. 5 | 0.9 | pyrophyllite | 1.1 | 5 |
| Ex. 11 | same as in Ex. 5 | 1.3 | wollastonite | 1.5 | 5 |
| Ex. 12 | same as in Ex. 10 | 1.1 | shale flakes | 1.2 | 3 |
| Ex. 14 | same as in Ex. 5 | 1.1 | zircon | 1.3 | 5 |
| Ex. 15 | same as in Ex. 5 (+ alumina powder) | 1.3 | — | 2.5 | 3 |

S.G.: apparent specific gravity.

EXAMPLES 16 AND 17

These examples relate to three-layer glass plates each consisting of a 25-mm thick base layer of foamed glass containing wire pieces, a 5-mm thick intermediate layer of foamed glass containing a nonmetallic filler and a 5-mm thick surface layer of dense glass.

The base layer was identical with the foamed glass of Example 5 or Example 10 except the degree of foaming. The nonmetallic filler in the intermediate layer was pyrophyllite or zircon. The dense glass layer was identical with the covering layer in Example 15 except thickness. The particulars were as shown in Table 3.

The method of producing these glass plates was fundamentally the same as in Examples 11-15. In this case the three kinds of materials for the base, intermediate and surface layers were packed in layers between the two belts.

The three-layer glass plates of Examples 16 and 17 were subjected to the high temperature heating test, in which flames were blown against the dense glass surface layer. After testing the samples of both Example 16 and Example 17 had some cracks in the dense glass surface layer, but the surface layer had not collapsed in either example.

TABLE 3

| | Base Layer | | Intermediate Layer | | Dense Glass Layer |
|---|---|---|---|---|---|
| | Wire Pieces | S.G. | Nonmetallic Filler | S.G. | S.G. |
| Ex. 16 | same as in Ex. 10 | 1.0 | pyrophyllite | 1.3 | 2.5 |
| Ex. 17 | same as in Ex. 5 | 0.8 | zircon | 1.8 | 2.5 |

S.G.: apparent specific gravity.

The following description relates to foamed glasses reinforced with inorganic nonmetallic, heat resistant fillers.

Conventional soda-lime glass and other alkali-lime glasses have softening points not lower than 600° C. but lower than 800° C. Inorganic nonmetallic fillers for use in this invention are required to be well above 1000° C. in melting temperature. When any of such fillers is added to a mixture of an alkali-lime glass powder and a foaming agent, the obtained foamed glass exhibits improved heat resistance. That is, if a block or plate of the foamed glass is heated gradually the block or plate retains its shape even though it is heated up to a temperature somewhat above the softening point of the glass itself. However, in the case of rapid heating as in a fire the same reinforced foamed glass may easily collapse if the filler was selected with little care. To render the foamed glass resistant to thermal shocks and practicalbe as a heat resistant building material, it is important to give consideration to the particle shape of the filler.

A fibrous material or a foliaceous or flaky material, i.e. a material characterized by unidirectional or two-dimensional growth of structure, is suitable as a nonmetallic filler in this invention Such a filler material well bonds to the foamed glass matrix and serves the function of binding and anchoring the foamed glass when the foamed glass is strained by heating thereby preventing cracking of the foamed glass and, in the event of local cracking, preventing development of the cracks Under heating an alkali-lime glass expands linearly as the temperature rises, but, except a very effectively annealed glass, the expansion temporarily slows down or shifts to shrinkage at a temperature near the transition point, viz. around 500° C., and thereafter expansion resumes until yielding and softening of the glass. Therefore, at temperatures around 500° C. the glass is in a very easily collapsible state, and this is particularly significant in the case of a foamed glass in which local differences in temperature are often created due to low conductivity of heat. In view of such facts, it is preferred to use a fibrous or flaky filler material which well exhibits the aforementioned binding and anchoring effect at temperatures around 500° C. At normal temperature most of inorganic fibrous or flaky filler materials are higher than 100 kg/mm$^2$ in tensile strength. Among such materials, truly effective reinforcing filler materials are those which retain at least 60% of the tensile strength at normal temperature even at the transition temperature of the employed alkali-lime glass.

Each individual particle of the fibrous or flaky filler should have a length of 0.1 to 3 mm and a diameter or thickness not smaller than 0.8 $\mu$m. If the length is less than 0.1 mm the expected binding and anchoring effect can hardly be exhibited. On the other hand, a suitable filler material in the form of fibrous or flaky particles longer than 3 mm cannot easily be obtained at a reasonable price, and the reinforcing effect does not appreciably augment even if such long particles of filler are used. If the diameter or thickness is smaller than 0.8 $\mu$m the filler is not very effective for preventing development of cracks in the foamed glass. It is suitable that each individual particle of the fibrous or flaky filler has an aspect ratio in the range from 30 to 150. Herein the term aspect ratio means the ratio of the length of a fibrous or flaky particle to its diameter, in the case of a fibrous particle, or to its thickness in the case of a flaky particle. The filler particles less than 30 in aspect ratio are low in pliability and hence in the binding and anchoring effect. When the filler particles are relatively large in length it is desirable that the aspect ratio too is relatively large.

Preferred examples of foliaceous or flaky filler materials are shale flakes, slate flakes and chlorite flakes. Although mica vermiculate and kaolin are comparable in the reinforcing effect, addition of these filler materials is liable to cause nonuniform foaming of the glass by reason of liberation of water of crystallization contained in the filler material at the stage of firing the mixed raw materials. Preferred examples of fibrous filler materials are wollastonite and asbestos represented by chrysotile. Attapulgite and sepiolite are also useful.

The object of the present invention can be accomplished also by using a nonmetallic powdery or granular filler material which has high resistance to thermal shocks. Resistance of a solid material to thermal shocks is represented by a thermal shock coefficient, R, given by the following equation:

$$R = KS(1\mu)/E\alpha (cal/sec.cm)$$

wherein K is heat conductivity, S is strength, $\mu$ is Poisson ratio, E is elastic modulus and $\alpha$ is thermal expansion coefficient. In the present invention it is suitable to use a nonmetallic powdery or granular material whose thermal shock coefficient R is not smaller than 1. Such a powdery or granular filler serves the function of absorbing and releaving the above described distortion of alkali-lime glass at temperatures around 500° C. For comparison, thermal shock coefficient of soda-lime glass is as small as about 0.5.

In using a nonmetallic powdery or granular filler in this invention it is important that the particle or grain size of the filler be within the range from 0.8 to 1000 $\mu$m. If the particle or grain size is smaller than 0.8 $\mu$m the filler particles or grains will be eroded by the melted glass to diffuse into the glass composition during the firing and foaming process and will consequently fail to provide thermal shock resistance to the foamed glass. If the particle or grain size is larger than 1 mm, the effect of the filler for enhancement of resistance to thermal shocks reduces because strains are liable to be induced in the reinforced foamed glass due to a difference in thermal expansion between the glass and the filler. Of course it is desirable that the filler particles or grains be uniformly dispersed in the foamed glass In adding a given weight of a filler it is favorable to use relatively small particles of filler with a view to disperse a large number of filler particles in the foamed glass. It is preferred to use a powdery filler which is 0.8 to 50 $\mu$m in particle size.

A preferred example of nonmetallic powdery or granular filler materials is pyrophyllite. Spinel and some cermets such as Al$_2$O$_3$-Cr cermets also serve as good fillers. It is also possible to use alumina, in particular corundum, or a mineral of high alumina silicate type such as feldspar, zircon, cordierite, mullite or sillimanite. Quartz is unsuitable as filler since it undergoes transformation and deteriorates at a temperature slightly above 500° C.

Most of the above named powdery materials can be spun into fiber filaments from a high temperature melt. It is possible to use a fibrous filler obtained in this way, on condition that the fibrous particles are 0.8–1000 $\mu$m in diameter, to thereby gain the binding and anchoring effect too.

It is possible and rather preferable to jointly use at least one kind of fibrous or flaky filler and at least one kind of powdery or granular filler. The proportions of the two kinds of fillers are arbitrary, though in most cases best results are obtained in the range from 3:7 to 7:3 by weight. For example, it is suitable to jointly use shale flakes and pyrophyllite powder, chlorite flakes and pyrophyllite powder, shale flakes and corundum powder, mica and corundum, wollastonite and spinel, chrysotile and a cermet powder, or wolllastonite and pyrophillite.

In this invention the content of the nonmetallic fibrous or flaky filler(s) and/or the powdery or granular filler(s) in the reinforced foamed glass is at least 1 wt % and is less than 10 wt %. If the content of such filler(s) is less than 1 wt % the reinforcing effect is insufficient. When the content of the same filler(s) reaches or exceeds 10 wt % difficulty is offered to firing of the mixed raw materials since the filler itself is a highly heat resistant material, and the reinforced foamed glass becomes low in porosity and sometimes becomes water absorptive.

In producing a foamed glass reinforced with any of the above described nonmetallic heat resistant fillers, the filler is added to and mixed with a mixture of an alkali-lime glass powder and a foaming agent. Said mixture may be granulated in advance Firing of the mixed materials is accomplished in the same manner as in producing a foamed glass containing wire pieces It is possible to further reinforce the foamed glass containing any of the above described nonmetallic fibrous, flaky, powdery and granular fillers by additionally dispersing therein pieces of a ferritic steel wire and/or a different type of reinforcing material such as metal bars or metal meshwork It is optional to produce a two-layer foam glass block or plate which consists of a base layer of a foamed glass reinforced with at least one nonmetallic filler and a covering layer of an ordinary foamed glass. When the foamed glass of the base layer contains shale flakes, the appearance of the foamed glass may be marred by the shale flakes exposed on the front surface. The covering layer has the effect of concealing the exposed shale flakes. The two layers are formed simultaneously so that the covering layer may inseparably bond to the base layer. It is suitable to make the covering layer relatively thin and not more than about 3 mm in thickness. Rapid heating of the covering layer will cause this layer to crack, but the cracking does not result in collapsing of the covering layer since it is fuse bonded to the reinforced base layer. If desired another covering layer of ordinary foamed glass may be formed on the opposite side of the base layer.

The covering layer of foamed glass may be reinforced by dispersing therein a nonmetallic heat resistant filler which does not mar the appearance of the foamed glass, such as pyrophyllite, spinel, zircon or alumina in powdery or granular form. The covering layer containing such a filler hardly cracks even when rapidly heated by flames and hence the thickness of the covering layer does not need to be very thin. The covering layer of foamed glass may further be covered with a relatively thin layer of a dense glass having a smooth surface to augment an ornamental effect. Also it is possible to form a covering layer of a dense glass directly on the foamed glass containing at least one nonmetallic heat resistant filler as an alternative to the above described covering layer of a foamed glass

EXAMPLES 18-28

In every example, a 25 mm thick plate of a foamed glass containing a fibrous or flaky filler was produced by the same method using fundamentally the same glass material, though the degree of foaming was variable.

A mixture of a soda-lime glass powder smaller than 150 μm in particle size and a suitable amount of calcium carbonate in fine powder form was granulated into grains smaller than 1 mm by using a small amount of water glass as binder. Then a selected filler was added to and mixed with the granulated glass material. The resultant mixture was introduced into a furnace by using a belt conveyor system having a pair of vertically spaced and horizontally running endless belts made of a heat resistant material. That is, the mixture was packed between the two belts and, in that state, was fired in the furnace at a predetermined temperature in the range from 750° to 900° C. A suitable pressure was applied to the fired material through the belts. The fired and foamed glass was slowly cooled, and the obtained foamed glass plate containing the heat resistant filler was cut into segments of suitable size. The particulars of the fillers used in these examples are shown in Table 4-1.

The reinforced foamed glasses of Examples 18-28 were subjected to the tests described hereinafter For comparison, some different foamed glasses were produced as Comparative Examples 7-17 and subjected to the same tests.

COMPARATIVE EXAMPLES 7-17

In every case the glass material and the foamed glass manufacturing method were the same as in Examples 18-28. The particulars of nonmetallic fillers used in these comparative examples are shown in Table 4-2.

High Temperature Heating Test

This test was identical with the test described hereinbefore with reference to FIG. 5 except that the temperature of the directly heated area of the glass plate was raised to 550°-600° C. in 3 min in this case.

Heating and Water Cooling Test

The sample of every foamed glass was a 10-cm cubic block. The foamed glass samples were gradually heated in an electric furnace up to 60° C. The heated samples were immediately put into iced water maintained at 0° C. and left in the water for 20 min. On the tested glass blocks the degree of cracking was visually examined.

Water Absorption Test

The sample of every foamed glass was a 10-cm cubic block. The foamed glass samples were kept immersed in water for 20 days to determine the degree of water absorption from an increase in weight of each sample. The result is shown in Tables 4-1 and 4-2

TABLE 4-1

| | Foamed Glass | | Fibrous or Flaky Filler | | | |
|---|---|---|---|---|---|---|
| | S.G. | Cont. of Filler (wt %) | Material | Maximum Length (mm) | Aspect Ratio | Water Absorption (wt %) |
| Ex. 18 | 1.2 | 6 | wollastonite | 3 | 150 | 1.0 |
| Ex. 19 | 0.8 | 1 | " | 0.1 | 30 | 0.3 |
| Ex. 20 | 1.4 | 9 | " | 0.7 | 65 | 2.1 |
| Ex. 21 | 1.2 | 5 | " | 1.9 | 90 | 0.6 |
| Ex. 22 | 1.0 | 2 | shale flakes | 0.1 | 35 | 0.5 |
| Ex. 23 | 1.1 | 4 | " | 1.3 | 125 | 0.8 |
| Ex. 24 | 1.5 | 9 | " | 3 | 140 | 2.3 |
| Ex. 25 | 0.9 | 1 | " | 0.8 | 90 | 0.4 |
| Ex. 26 | 1.1 | 5 | mica | 2.8 | 90 | 1.2 |
| Ex. 27 | 1.2 | 7 | attapulgite | 0.2 | 40 | 1.5 |
| Ex. 28 | 1.3 | 8 | chrysotile | 1 | 100 | 2.1 |

S.G.: apparent specific gravity.

TABLE 4-2

| | Foamed Glass | | Fibrous or Flaky Filler | | | |
|---|---|---|---|---|---|---|
| | S.G. | Cont. of Filler (wt %) | Material | Maximum Length (mm) | Aspect Ratio | Water Absorption (wt %) |
| Comp. Ex. 7 | 0.9 | 0.5 | wollastonite | 5 | 350 | 0.4 |
| Comp. Ex. 8 | 1.5 | 12 | " | 0.1 | 30 | 15.3 |
| Comp. Ex. 9 | 1.2 | 7 | " | 0.05 | 5 | 0.8 |
| Comp. Ex. 10 | 1.0 | 0.7 | shale flakes | 7 | 180 | 0.5 |

TABLE 4-2-continued

| | Foamed Glass | | Fibrous or Flaky Filler | | | Water Absorption (wt %) |
|---|---|---|---|---|---|---|
| | S.G. | Cont. of Filler (wt %) | Material | Maximum Length (mm) | Aspect Ratio | |
| Comp. Ex. 11 | 1.5 | 9 | " | 0.06 | 25 | 2.1 |
| Comp. Ex. 12 | 2.1 | 13 | " | 0.3 | 50 | 17.2 |
| Comp. Ex. 13 | 1.1 | 1 | SiC whisker | 0.002 | 20 | 0.3 |
| Comp. Ex. 14 | 1.6 | 20 | shale flakes | 0.8 | 90 | 21.8 |
| Comp. Ex. 15 | 1.8 | 30 | " | 0.8 | 90 | 25.0 |
| Comp. Ex. 16 | 1.7 | 30 | wollastonite | 0.7 | 70 | 27.3 |
| Comp. Ex. 17 | 1.0 | 0 | — | — | — | 0.4 |

S.G.: apparent specific gravity.

The reinforced foamed glasses of Examples 18-28 passed the high temperature heating test and the heating and water cooling test with very good results. The high temperature heating test produced only a small number of tiny cracks in the samples of Examples 18-26 and 28 and somewhat larger cracks in the sample of Example 27. No cracking was observed in the samples subjected to the heating and water cooling test except that tiny cracks were found in the sample of Example 26.

The high temperature heating test produced a small number of tiny cracks in the foamed glasses of Comparative Examples 8 and 12, somewhat larger cracks in the foamed glasses of Comparative Examples 7 and 9-11, and very large cracks (which resulted in local breaking in some cases) in the foamed glasses of Comparative Examples 13-17. The heating and water cooling test produced small cracks in the foamed glasses of Comparative Examples 7-12 and large cracks in the foamed glasses of Comparative Examples 13-17. The foamed glasses of Comparative Examples 8, 12 and 14-16 were judged to be insufficient in the degree of sintering

EXAMPLES 29-44

In these examples nonmetallic powdery or granular fillers were selectively used, as shown in Table 5-1, in place of the fibrous or flaky fillers in the foregoing examples, and in Examples 41-44 fibrous or flaky fillers and ferritic steel wire pieces were selectively used together with a powdery filler That was the sole point of difference from Examples 18-28.

COMPARATIVE EXAMPLES 18-26

As shown in Table 5-2, powdery or granular fillers were used in producing foamed glasses not in accordance with the invention. The glass material and the manufacturing method were the same as in Examples 18-44.

TABLE 5-1

| | Foamed Glass | | Powdery or Granular Filler | | Water Absorption (wt %) |
|---|---|---|---|---|---|
| | S.G. | Cont. of Filler (wt %) | Material | Particle or Grain Size (μm) | |
| Ex. 29 | 1.1 | 5 | pyrophyllite | 0.8 | 0.7 |
| Ex. 30 | 0.8 | 1 | " | 30 | 0.3 |
| Ex. 31 | 1.2 | 7 | " | 50 | 1.0 |
| Ex. 32 | 1.5 | 9 | " | 20 | 1.9 |
| Ex. 33 | 1.2 | 6 | " | 500 | 0.9 |
| Ex. 34 | 1.7 | 9 | " | 1000 | 2.3 |
| Ex. 35 | 1.5 | 9 | $Al_2O_3$—Cr cermet | 2 | 1.9 |
| Ex. 36 | 1.3 | 5 | " | 30 | 0.8 |
| Ex. 37 | 1.0 | 1 | corundum | 7 | 0.4 |
| Ex. 38 | 1.3 | 8 | " | 50 | 1.5 |
| Ex. 39 | 1.3 | 2 | feldspar | 40 | 0.3 |
| Ex. 40 | 1.8 | 3 | zircon | 3 | 1.5 |
| Ex. 41 | 1.3 | 4/2 | pyrophyllite/ wollastonite | 2 0.5 mm (90)* | 0.9 |
| Ex. 42 | 1.5 | 5/3 | corundum/13 Cr steel wire pieces | 2 3 mm (30)* | 1.2 |
| Ex. 43 | 1.2 | 3/6 | pyrophyllite/ mica | 15 0.8 mm (70)* | 1.1 |
| Ex. 44 | 1.4 | 4/4 | corundum/ mica | 1 1 mm (80)* | 1.8 |

*The parenthesized value is aspect ratio.

TABLE 5-2

| | Foamed Glass | | Powdery or Granular Filler | | Water Absorption (wt %) |
|---|---|---|---|---|---|
| | S.G. | Cont. of Filler (wt %) | Material | Particle or Grain Size (μm) | |
| Comp. Ex. 18 | 1.4 | 5 | pyrophyllite | 1500 | 5.3 |
| Comp. Ex. 19 | 0.7 | 0.7 | " | 8 | 0.4 |
| Comp. Ex. 20 | 1.7 | 15 | corundum | 30 | 18.3 |
| Comp. Ex. 21 | 1.1 | 10 | glass frit | 50 | 2.5 |
| Comp. Ex. 22 | 1.2 | 5 | borax | 70 | 1.7 |
| Comp. Ex. 23 | 1.1 | 7 | cryolite | 35 | 2.1 |
| Comp. Ex. 24 | 1.4 | 20 | pyrophyllite | 30 | 19.7 |
| Comp. Ex. 25 | 1.7 | 30 | " | 30 | 28.5 |
| Comp. Ex. 26 | 1.5 | 30 | corundum | 2 | 31.3 |

The reinforced foamed glasses of Examples 29-44 passed the high temperature heating test and the heating and water cooling test with very good results. The high temperature heating test produced only a small number of tiny cracks in the samples of Examples 29–37 and 41–44 and somewhat larger cracks in the sample of Examples 38–40. No cracking was observed in the samples subjected to the heating and water cooling test.

The high temperature heating test produced relatively large cracks in the foamed glasses of Comparative Examples 18–20 and very large cracks (which resulted in local breaking in some cases) in the foamed glasses of Comparative Examples 21–26. The heating and water cooling test produced small cracks in the foamed glasses of Comparative Examples 18–20 and large cracks in the foamed glasses of Comparative Examples 21–26. The foamed glasses of Comparative Examples 20 and 24–26 were judged to be insufficient in the degree of sintering.

EXAMPLES 45–48

These examples relate to two-layer glass plates each consisting of a base layer of a foamed glass containing a nonmetallic heat resistant filler and a covering layer of either a reinforced foamed glass or a dense glass. In every example the base layer was 25 mm thick, and the covering layer had a thickness of 5 mm or 3 mm.

As shown in Table 6 the base layer was selected from the reinforced foamed glasses of Examples 18, 23, 26 and 42. In Examples 45–47 the material of the covering layer was selected from the reinforced foamed glasses of Examples 18, 21 and 33, and in Example 48 the covering layer was of a dense glass formed by firing 1–4 mm particles of soda-lime glass. In every case the two-layer glass plate was produced by the same method as in Examples 11–15.

The two-layer glass plates of these examples were subjected to the above-described high temperature heating test, in which flames were blown against the covering layer. After testing, in the samples of Examples 45–47 a small number of tiny cracks were found in the covering layer. In the sample of Example 48 somewhat larger cracks were found in the covering layer of dense glass, but the covering layer remained firmly bonded to the base layer without collapsing or breaking.

TABLE 6

| | Base Layer | | Covering Layer | | |
|---|---|---|---|---|---|
| | Foamed Glass | S.G. | Material | S.G. | Thickness (mm) |
| Ex. 45 | same as in Ex. 18 (containing pyrophyllite) | 1.2 | foamed glass of Ex. 31 (containing pyrophyllite) | 1.2 | 5 |
| Ex. 46 | same as in Ex. 23 (containing shale flakes) | 1.1 | foamed glass of Ex. 18 | 1.2 | 5 |
| Ex. 47 | same as in Ex. 26 (containing mica) | 1.1 | foamed glass of Ex. 33 (containing pyrophyllite) | 1.2 | 5 |
| Ex. 48 | same as in Ex. 42 (containing corundum and wire pieces) | 1.5 | dense glass | 2.5 | 3 |

S.G.: apparent specific gravity.

EXAMPLES 49 and 50

These examples relate to three-layer glass plates each consisting of a 25-m thick base layer of foamed glass containing a nonmetallic heat resistant filler, a 5-mm thick intermediate layer of a foamed glass containing a nonmetallic heat resistant filler and a 5-mm thick surface layer of dense glass.

As shown in Table 7 the base layer was identical with the reinforced foamed glass of Examples 26 or 44, and the material of the intermediate layer was selected from the reinforced foamed glasses of Examples 31 and 33. The dense glass layer was identical with the covering layer in Example 48. These three-layer plates were produced by the same method as in Examples 16 and 17.

TABLE 7

| | Base Layer | | Intermediate Layer | | Dense Glass Layer |
|---|---|---|---|---|---|
| | Foamed Glass | S.G. | Material | S.G. | S.G. |
| Ex. 49 | same as in Ex. 44 (containing mica and corundum) | 1.4 | foamed glass of Ex. 31 (containing pyrophyllite) | 1.2 | 2.5 |
| Ex. 50 | same as in Ex. 26 (containing mica) | 1.1 | foamed glass of Ex. 33 (containing pyrophyllite) | 1.2 | 2.5 |

The three-layer glass plates of Examples 49 and 50 were subjected to the high temperature heating test, in which flames were blown against the dense glass surface layer. After testing the samples of both Examples 49 and 50 had some cracks in the dense glass surface layer, but the surface layer remained firmly bonded to the intermediate layer without collapsing or breaking.

What is claimed is:

1. A reinforced and heat resistant foamed glass, comprising 0.2 to 5 wt % of pieces of a corrosion resistant ferritic steel wire containing 13–20 wt % of Cr dispersed in a matrix of foamed glass, the thermal expansion coefficient of said steel wire being 1.1 to 1.3 times as large as the thermal expansion coefficient of the glass, the wire pieces being each 3 to 50 mm in length and 0.01 to 2 mm$^2$ in cross-sectional area.

2. A foamed glass according to claim 1, wherein the wire pieces are circular in cross-sectional shape and are nonlinear.

3. A foamed glass according to claim 1, wherein the wire pieces are circular in cross-sectional shape and each have at least one dented region in the surface thereof.

4. A foamed glass according to claim 1, wherein the wire pieces are elliptical in cross-sectional area.

5. A foamed glass according to claim 4, wherein the wire pieces are nonlinear.

6. A foamed glass according to claim 4, wherein each of the wire pieces have at least one dented region in the surface thereof.

7. A foamed glass according to claim 1, wherein the wire pieces are rectangular in cross-sectional shape.

8. A foamed glass according to claim 1, wherein the wire pieces are nonlinear.

9. A foamed glass according to claim 7, wherein each of the wire pieces has at least one dented region in the surface thereof.

10. A foamed glass according to claim 1, further comprising an inorganic nonmetallic reinforcing filler dispersed in the foamed glass matrix.

11. A foamed glass according to claim 1, which has an apparent specific gravity in the range from 0.6 to 2.0.

12. A foamed glass according to claim 1, wherein the foamed glass is of a soda-lime glass.

13. A foamed according to claim 1, which is overlaid with another foamed glass.

14. A foamed glass according to claim 13, wherein said another foamed glass is overlaid with an unfoamed glass.

15. A foamed glass according to claim 13, wherein said another foamed glass comprises an inorganic nonmetallic heat resistant filler.

16. A foamed glass according to claim 1, which is overlaid with an unfoamed glass.

17. A reinforced and heat resistant foamed glass, comprising less than 10 wt % and not less than 1 wt % at least one inorganic nonmetallic reinforcing filler dispersed in a matrix of a foamed alkali-lime glass, said at least one filler being higher than 1000° C. in melting temperature and being selected from fibrous and flaky materials 0.1-3 mm in length of each particle thereof, wherein the flaky materials are selected from the group consisting of shale flakes, slate flakes and chlorite flakes, and wherein the fibrous materials are selected from the group consisting of wollastonite, chyrsotile, attapulgite and sepiolite, and wherein further the ratio of the length of each filler particle to the thickness of the same particle is in the range from 30 to 150.

18. A foamed glass according to claim 17, further comprising pieces of a ferritic corrosion resistant steel wire dispersed in the matrix of the foamed glass.

19. A foamed glass according to claim 17 which is overlaid with another foamed glass.

20. A foamed glass according to claim 19, wherein said another foamed glass is overlaid with an unfoamed glass.

21. A foamed glass according to claim 19, wherein said another foamed glass comprises an inorganic nonmetallic heat resistant filler.

22. A foamed glass according to claim 17, which is overlaid with an unfoamed glass.

23. A foamed glass according to claim 1, wherein wire pieces are circular in cross-sectional shape and each have at least one protruding region in the foamed glass surface thereof.

24. A foamed glass according to claim 4, wherein the wire pieces are circular in cross-sectional shape and each have at least one protruding region in the foamed glass surface thereof.

25. A foamed glass according to claim 7, wherein the wire pieces are circular in cross-sectional shape and each have at least one protruding region in the foamed glass surface thereof.

* * * * *